[11] 3,594,556

| [72] | Inventor | William R. Edwards<br>California, Md. |
|---|---|---|
| [21] | Appl. No. | 789,729 |
| [22] | Filed | Jan. 8, 1969 |
| [45] | Patented | July 20, 1971 |
| [73] | Assignee | The United States of America as represented by the Secretary of the Navy |

[54] OPTICAL SIGHT WITH ELECTRONIC IMAGE STABILIZATION
11 Claims, 7 Drawing Figs.

[52] U.S. Cl. .................................................... 235/150.27,
33/46, 178/6.8, 250/201, 250/213
[51] Int. Cl. .................................................... G06g 7/78
[50] Field of Search............................................235/150.26,
150.27; 33/46, 46.5; 356/4, 5, 6, 9; 250/201, 203, 213; 178/68; 95/12.5

[56] References Cited
UNITED STATES PATENTS

| 2,405,051 | 7/1946 | Poitras et al. ................. | 356/9 |
|---|---|---|---|
| 2,792,989 | 5/1957 | Luck ............................ | 235/150.27 X |
| 2,930,894 | 3/1960 | Bozeman...................... | 33/46.5 X |
| 2,937,559 | 5/1960 | Shute et al. .................. | 356/247 |
| 2,986,966 | 6/1961 | McCartney et al. .......... | 356/149 |
| 3,098,933 | 7/1963 | Barasch........................ | 250/203 |
| 3,393,320 | 7/1968 | Arazi............................ | 250/217 |
| 3,515,881 | 6/1970 | Philbrick et al............... | 250/203 X |

*Primary Examiner*—Eugene G. Botz
*Assistant Examiner*—Felix D. Gruber
*Attorneys*—E. J. Brower, Arthur L. Branning, T. O. Watson and T. J. Madden

ABSTRACT: This invention is directed to an electrically augmented sight particularly adapted for use in aerial reconnaissance. The sight locates and fixes the position of an object viewed from the air. A wide-angle optical viewer is used to locate and hold the object in sight. An electron image motion-stabilizing system in the sight provides a stable view of the object. When the stable view is obtained, computer operation is initiated to make two consecutive measurements of the bearing angle of the target relative to the flight path of the aircraft. After the aircraft has traveled a predetermined distance, usually 1,000 yards, the second measurement is made. The bearing angle at the point of the second measurement is recorded and the computer utilizing the sine law calculates the range of the target at the recorded bearing.

PATENTED JUL 20 1971　　　　　　　　　3,594,556

INVENTOR
WILLIAM R. EDWARDS

BY

*Arthur L. Fleming*
*Thomas J. Madden*
ATTORNEYS

3,594,556

OPTICAL SIGHT WITH ELECTRONIC IMAGE STABILIZATION

STATEMENT OF GOVERNMENT INTEREST

The invention defined herein may be manufactured and used by or for the Government of the United States of America for governmental purposes without the payment of royalties thereon or therefor.

BACKGROUND OF THE INVENTION

1. Field of the Invention

This invention is directed to an improved sight for use in an aerial reconnaissance. In particular, this invention is directed to an electronically augmented sight which increases the visual acquisition of the operator when used in aerial reconnaissance.

2. Description of the Prior Art

Standard telescopic devices were generally used in the prior art for aerial reconnaissance. However, the time required to acquire, identify and fix the position of an object is very short and the results achieved were highly unsatisfactory.

In addition, the use of a telescope in aerial reconnaissance has a number of other drawbacks. A telescope presents a moving optical image resulting from the hand movement of the scope and the vibrations of the aircraft. A telescope, due to its narrow receiving angle, has a limited field of view. Telescopes also have poor optical enhancement. These drawbacks do not facilitate the identification of low contrast objects under minimum light level conditions and often cause operator fatigue.

In addition, the prior art has no method for rapidly and accurately determining the ground range and bearing to an object once it is located.

SUMMARY OF THE INVENTION

The inventive sight has a wide angle of view. It has an image stabilization system which eliminates movement from the viewed image of an object and it utilizes electronic enhancement to present a clear picture of the object being viewed. The sight is also provided with means for automatically and rapidly obtaining range and bearing to an object. The inventive sight also increases the ability of the viewer to identify and object and make meaningful position measurement.

The inventive sight utilizes a wide-angle viewer to obtain a natural view of an object. A viewing lens is mounted on the support for the wide-angle viewer. The optical image from this lens is converted into an electron stream and focused on a phosphor screen. Deflection of the stream is controlled by the output of a pair of rate gyroscopes. The gyroscopes shift the electron stream to produce stabilization of the image received by the phosphor screen. The image on the phosphor screen is then transmitted by a vidicon to a cathode-ray tube. The output of the cathode-ray tube is superimposed on the output of the wide-angle viewer. A computer associated with the sight registers a reading of the bearing of the object sighted from the aircraft at two positions and calculates and records the range to the object being viewed. The bearing at the second position is automatically recorded.

An object of this invention is to provide an electronically augmented sight which can provide a stabilized image.

A further object of this invention is to provide an improved sight for locating an object from an aircraft.

Yet another object of this invention is to provide an improved sight for locating an object for an aircraft which electronically enhances the image of the object.

A still further object of the invention is to provide an improved sight for locating and fixing the position of an object from an aircraft.

BRIEF DESCRIPTION OF DRAWINGS

These and other objects, advantages and features of the invention will be apparent from the following drawings in which.

DESCRIPTION OF PREFERRED EMBODIMENTS

The inventive sight 10 is mounted in a case 11 which is attached to a gimbaled support 12. Molded grips 13 and 14 are provided for positioning the sight in a hand-held mode.

Figure 2:
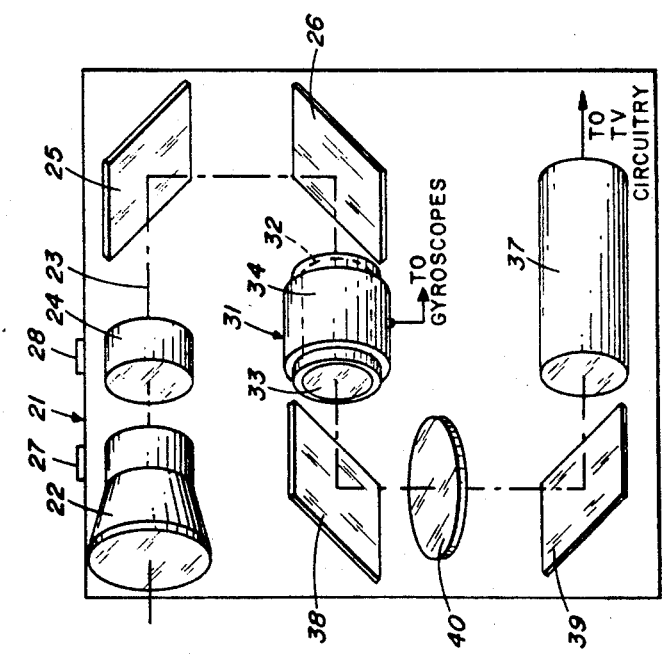
FIG. 2 is a view of the image stabilization components mounted on the top of the inventive sight.

The image stabilization system (FIG. 2) is mounted on a plate 21 in the top of the sight. Objective lens 22 is mounted on the plate and receives the optical image and passes it along projection path 23.

Aspheric lens 24 and mirrors 25 and 26 are similarly mounted on plate 21 in the projection path 23. Control knobs 27 and 28 are geared to lenses 22 and 24, respectively, and can be adjusted from outside case 11 to focus the lenses.

An image intensifier tube 31 is mounted on plate 21. This tube is similar to that described in U.S. Pat. No. 3,393,320, assigned to the Itek Corporation. The optical image received at input face 32 is converted to an electron stream by the tube and presented as an optical image at the output face 33 of the tube. The position of the electron stream is controlled by yoke 34 which is in turn controlled by rate gyroscopes 35 and 36.

The image at the output of face 33 is relayed to a vidicon tube 37 by mirrors 38 and 39 and lens 40. Mirrors 38 and 39 as well as mirrors 25 and 26 provide double folds in the light path in order to give a very compact optical system.

The objective lens 22 has a flat field and the input face 32 of the large intensifier tube 31 is curved. This results in a sag and distortion between the two surfaces. The aspheric lens is utilized to correct this and provide a flat distortionless field for stabilization by the image intensifier tube.

Vidicon 37 together with appropriate circuitry (not shown) contained in box 41 and cathode-ray tube 42 forms a conventional closed-circuit television system. The cathode-ray tube is shown with a green phosphor.

Figure 5:
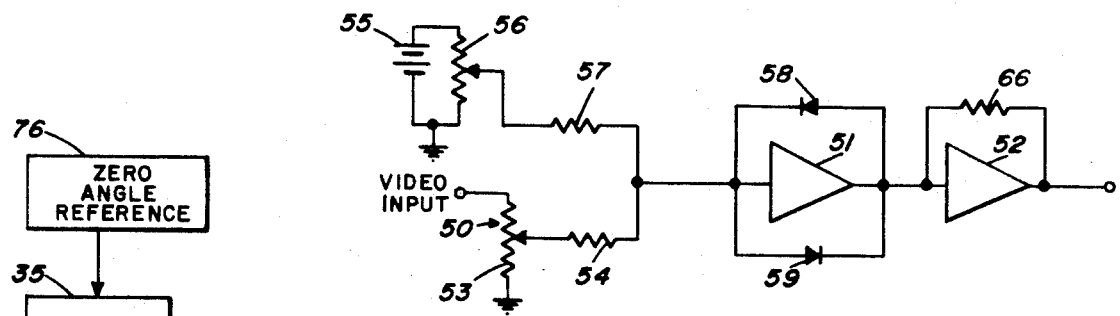
FIG. 5 shows the contrast enhancement circuit utilized in the closed-circuit television system.

A contrast enhancement circuit which can be connected in the video chain of the television system between the video detector and amplifier is shown in FIG. 5. The circuit utilizes two operational amplifiers 51 and 52. The negative-going video signal from the video detector is connected to operational amplifier 51 through potentiometer 53 and resistor 54. A positive voltage signal provided by direct source 55 and potentiometer 56 is connected to the junction of amplifier 51 and resistor 54 by a resistor 57. Resistors 54 and 57 are of equal value. Diodes 58 and 59 are connected in a feedback arrangement with amplifiers 51. The amplifier 51 is connected to the second operational amplifier 52 which has a resistor 60 connected in a feedback arrangement.

The operation of the image stabilization circuitry and the closed-circuit television system operate in conjunction. This operation is initiated by a switch 15 mounted in handgrip 14.

Figure 1:
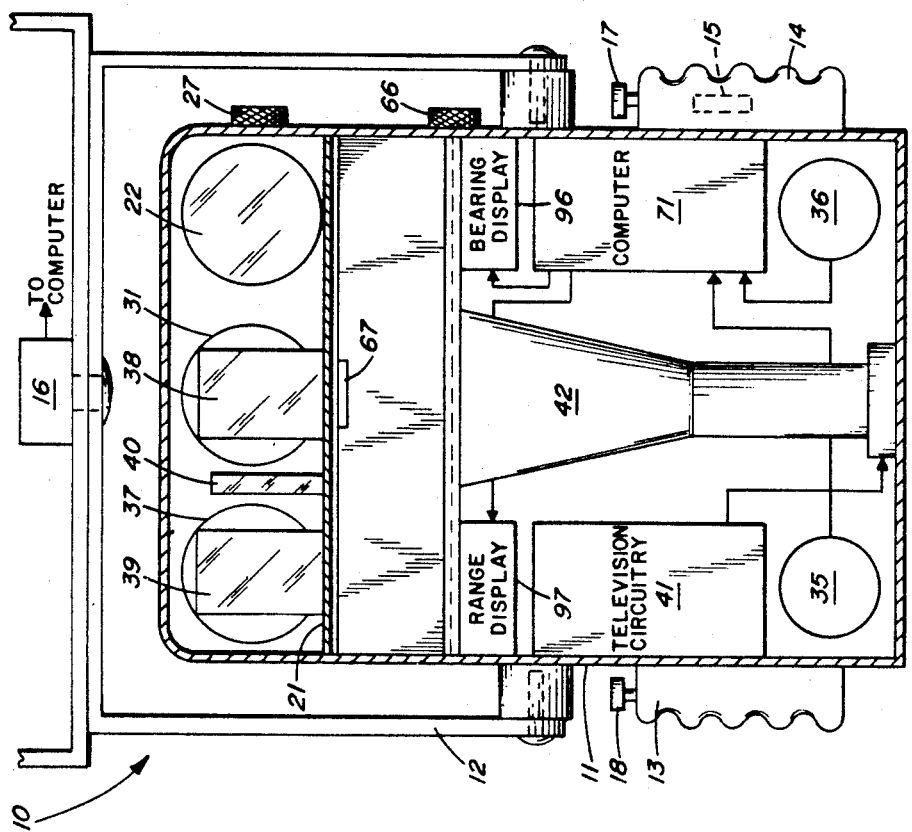
FIG. 1 is a view of the front of the inventive sight with the covering plate removed.
Figure 3:
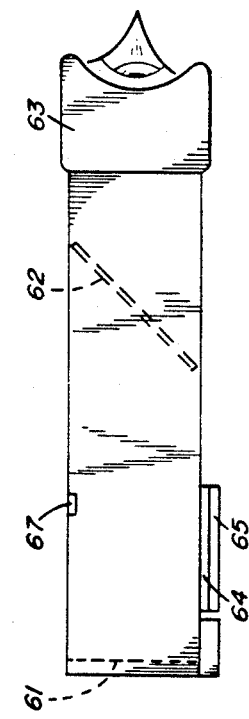
FIG. 3 is a cutaway view of the wide-angle viewer.

A wide-angle viewer (FIG. 3) having a 60° angle of view is mounted in case 11 below the image stabilization system. The viewer utilizes a piece of plate glass mounted in the front of the case 11. The optical image received by glass 61 is imaged onto a green reflecting dichroic mirror 62 which is operative to pass the image. An eyepiece 63 is mounted on the back of the case. The cathode-ray tube 42 is mounted directly below mirror 62 and the image at the output of the tube is superimposed on the optical image of the object viewed at mirror 62. The green color of the cathode-ray tube image allows for easy separation of the two views.

Polaroid filters 64 and 65 are mounted in a recess below the main optical path. The filters can be moved into the optical path by control knob 66. A stop 67 limits the movement of the filters. The first filter 64 operates as a haze filter and the second filter 65 operates in conjunction with the first filter to block all light which would otherwise pass from the glass 61 to mirror 62. The second filter enables the operator to view the electronically enhanced image produced at the face of the cathode-ray tube.

Figure 6:
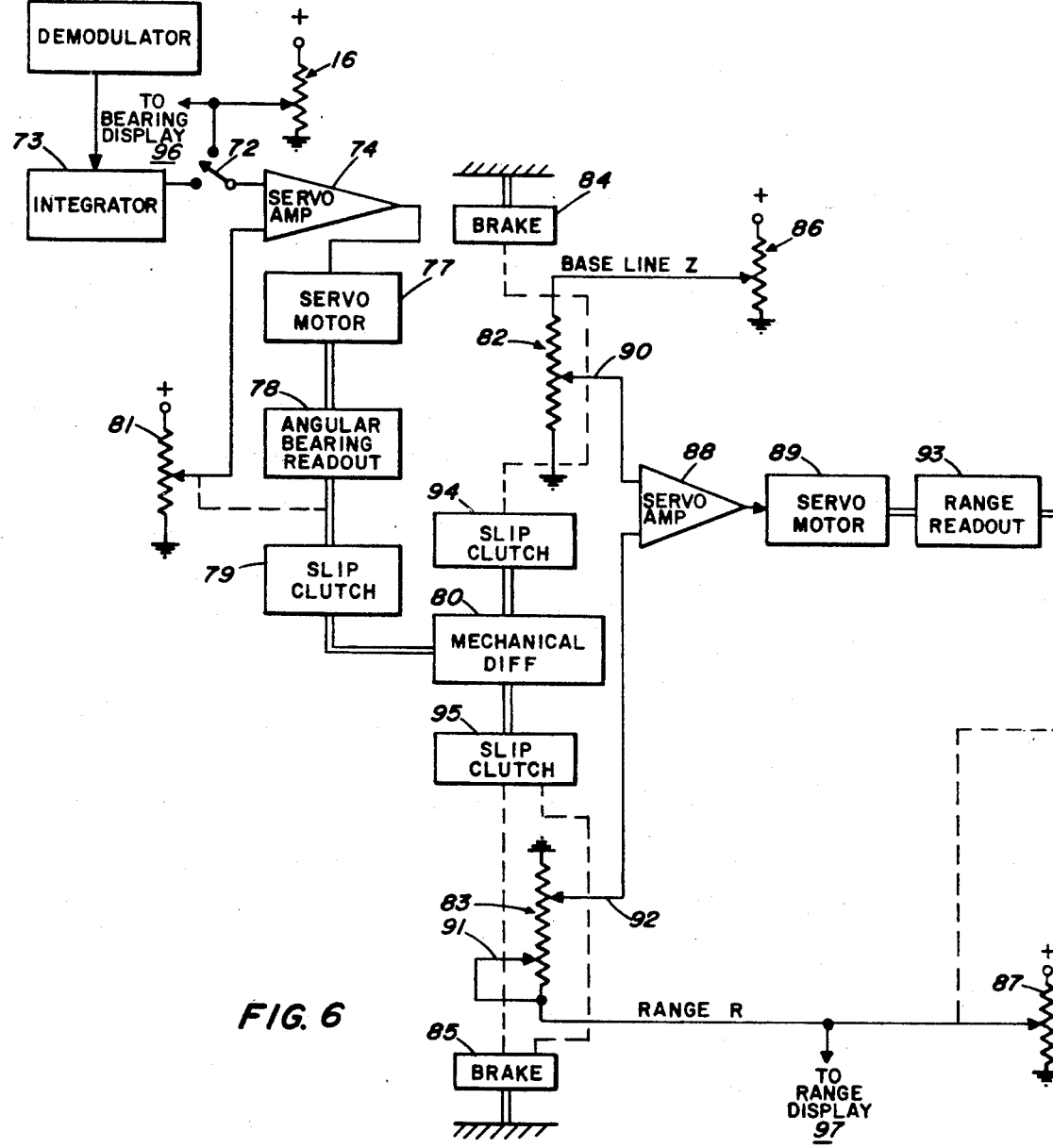
FIG. 6 shows the computer utilized in the inventive sight.

The computer 71 which is utilized to determine range is shown in FIG. 6. The computer normally receives its input from the potentiometer 16, which is mounted on the gimbaled support 12. When the sight is used in the hand-held mode, switch 72 is moved from the potentiometer to the integrator 73 and the input to servoamplifier 74 is supplied by gyroscope 35 through demodulator 75 and integrator 73. A zero-angle reference 76 is combined with the output of gyroscope 35.

The output of the servoamplifier is fed to a servomotor 77 which is connected by mechanical drive linkage to an angular bearing readout gear 78, clutch 79 and mechanical differential gearing 80.

Angular bearing readout is connected to the wiper arm of potentiometer 81 which provides feedback to servoamplifier 74. The mechanical differential in turn drives two sine potentiometers 82 and 83. The movement of these potentiometers is controlled by brakes 84 and 85. A signal representative of the base line through which the aircraft flies is fed to potentiometer 82 by adjustable potentiometer 86 and a signal representative of range is fed to the other potentiometer 83 by adjustable potentiometer 87. The outputs of the potentiometers are combined in servoamplifier 88 which drives servomotor 89. These outputs are derived through wiper arms 90, 91 and 92. A range readout 93 is mechanically connected to the servomotor. The range readout is used to control the output of potentiometer 87. Slip clutches 94 and 95 are provided for potentiometers 82 and 83, respectively.

Circuitry, not shown, is provided in the bearing display 96 to convert the output of potentiometer 16 to a bearing reading. Circuitry, not shown, is also provided in the range display 97 to convert the output of potentiometer 87 to a range readout.

Operation of the computer is controlled by switch 17 which initiates operation of the computer. The computer is turned off by switch 18 after the second measurement and the brakes 84 and 85 released thereby.

OPERATION

Figure 4:
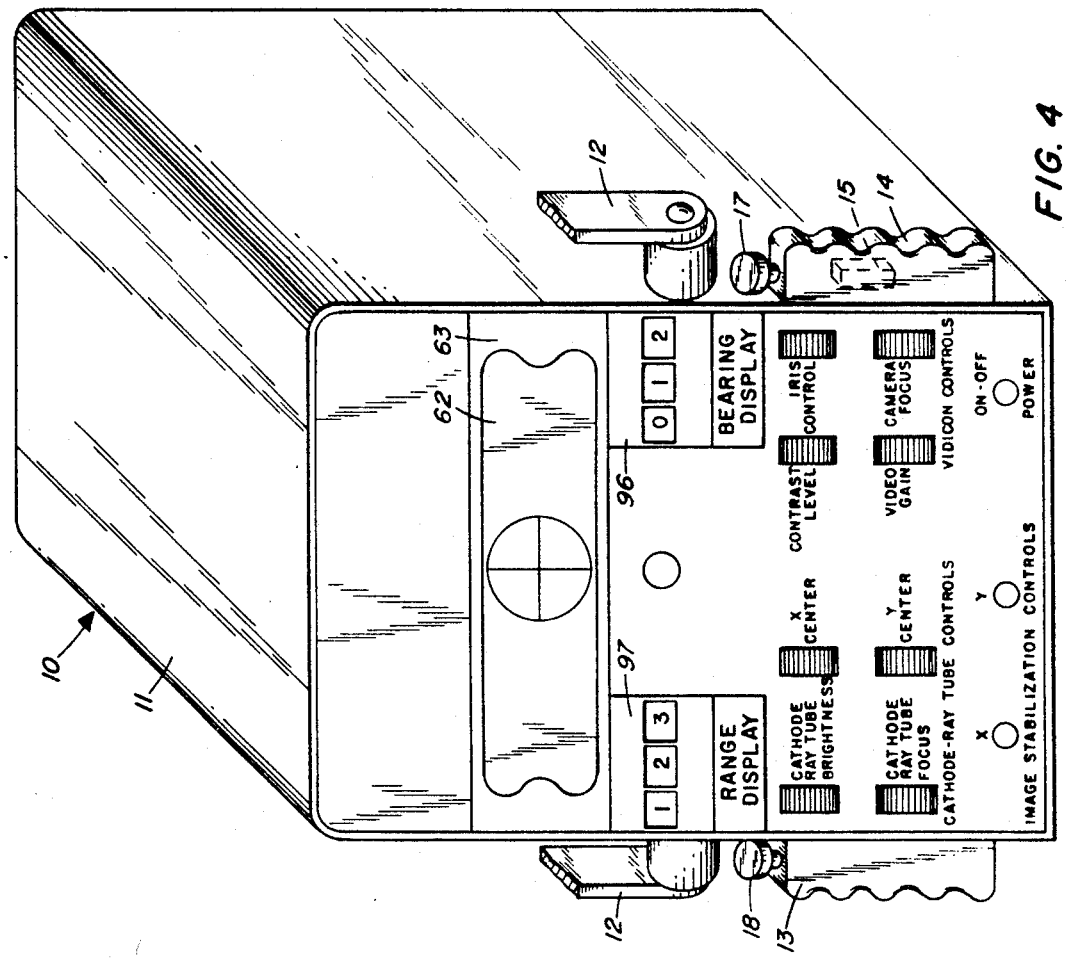
FIG. 4 is a view of the sight from the rear showing the various control switches.

In operation, the sight is placed in condition for operation by turning on the on-off switch shown in FIG. 4 and an observer in the aircraft scans the ground or sea through the wide-angle viewer of the inventive sight 11. The wide-angle viewer enables the observer to readily locate an object and as the aircraft moves the sight is also moved to keep the object in view.

When the observer sights an object of the type he is looking for, he centers it on the crosshairs of dichroic mirror 62. At this point, using switch 15, he turns on the image stabilization system. The image of the object is received by the objective lens 22 and transmitted along the projection path 23 through aspheric lens 24 to mirror 25 which is mounted at a 45° angle to the aspheric lens. Mirror 25 reflects the signal to mirror 26 which then passes it to the input faceplate 32 of the image intensifier tube 31.

The objective lens of the electronic image stabilization system necessarily has a narrow angle of view and images the object when the object is centered on the viewing screen of the wide-angle viewer.

A photosensitive coating on the input face 3 of the image intensifier tube 31 converts the optical image into an electron stream. The electrons are distributed such that they correspond to the constant variations in the optical image. The beam is accelerated by an internal electric field associated with the image intensifier tube. This field is generated by a 10- kilovolt potential. Magnetic focusing coils in yoke 34 focus the electron stream to provide an image at the output face of the tube. The output face 33 is coated with fluorescent material which fluoresces in response to the impingement of electrons thereon to produce an optical image. The image thus produced is normally amplified in intensity relative to the image at the input face of the tube. This amplification is controlled by the strength of the internal field associated with the tube.

The output of tube 31 is conveyed by mirrors 38 and 39 and lens 40 to the faceplate of a standard 525 line vidicon 37. Vidicon 37 together with associated electronic equipment in box 41, not shown, and cathode-ray tube 42 form a conventional closed-circuit television system. The television system is utilized to provide optical enhancement which is essential when the sight is used at night. The output face of the cathode-ray tube is coated with a phosphor which provides a green image. The green image is superimposed on the natural image obtained through the wide-angle viewer at dichroic mirror 62. The green color of the image facilitates easy identification.

Conventional brightness-centering controls are utilized with the cathode-ray tube 42. Conventional contrast, gain, focus and iris controls are provided with the vidicon 37. These are shown on the control panel of the sight in FIG. 4.

FIG. 5 shows a circuit which can be used in the video chain between the video detector and amplifier to enhance the contrast of the image at the cathode-ray tube. Two high-speed operational amplifiers 51 and 52 are used. The first operational amplifier 51 operates as a comparator where a negative-going video signal at resistor 54 is compared to a fixed positive direct current voltage at resistor 37. The fixed voltage will be normally set very near the black level of the video signal. The amplifier 51 generates an output when the amplitude of the video signal equals the direct current level. The second amplifier 52 then inverts this signal to obtain the proper polarity for display. When the direct current signal is at the level described, a black and white signal showing only outlines of the object received will be displayed on the screen of the cathode-ray tube 42. The contrast can be varied by tap on potentiometer 56.

Two rate gyroscopes 35 and 36 are used to stabilize the image focused on the output face of the image intensifier tube 31. The gyroscopes sense motion of the sight in the x and y directions and provide angular rate signals representative of this motion. These signals are fed through x and y integrating amplifiers, not shown, which integrate the signals to provide negative feedback signals to the yoke 34 associated with the image tube 31. As a result the image at output face will be stabilized in real time and the video image superimposed at mirror 62 will also be stabilized in position. X and y controls are provided on the control panel to enable the observer to control the alignment of the stabilized image at the output face 33 of tube 3.

When the stabilized image is superimposed and identification of the object observed is made, the observer may then initiate the automatic range and bearing circuitry to obtain the range and bearing of the object in relation to the aircraft. Switch 17 on hand grip 14 is utilized for this purpose and is operable to turn on the computer 71 and sequentially activate brakes 84 and 85. Switch 18 and hand grip 13 is utilized to turn off the computer 71 and release brakes 84 and 83.

In operation, when the object cited is centered and stabilized, switch 17 is initiated and either potentiometer 16 or gyroscope 35 is connected to the input of servoamplifier 74. Potentiometer 16 is utilized when the sight is mounted in gimbals and gyroscope 35 is utilized when the sight is operated in the hand-held mode.

The potentiometer 16 is positioned to yield a zero output when the bearing to the object sighted from the airplane is zero and a maximum output when the bearing is 180°.

The output of the gyroscope 35 which is fed to the computer is compared with the output of the zero-angle reference and has a zero output when the bearing is zero and a maximum output when the bearing is 180°. This output is demodulated and integrated before being fed to servoamplifier 74.

Amplifier 74 energizes servomotor 77 which in turn drives angular bearing readout 78 and clutch 79. Readout 78 is also utilized to position the wiper arm of a potentiometer 81 whose output is fed back to servoamplifier 74 to control its output.

A mechanical differential gear 80 is connected to clutch 79 to be moved thereby. The differential gear in turn drives the wiper arms 90 of the sine potentiometers 82 and 83 through clutches 94 and 95. These potentiometers, as is well known in the art, can be used to give the sine of angle as represented by the position of its wiper arm.

Potentiometer 82 is used to obtain the sine of angle A in FIG. 6. This measurement is obtained when brake 84 is activated after switch 17 is pressed. The computer brake 84 holds the arm 90 of potentiometer 82 at the angle A and slip clutch 94 disconnects the wiper arm from the differential 80 when brake 84 is applied.

Sine potentiometer 83 has two wiper arms 91 and 92. The first wiper arm 91 is connected from the point of zero voltage to the resistive part of the potentiometer. The two arms are moved in tandem by the mechanical differential 80 until brake 85 arrest movement of the wiper arm 91 of potentiometer 83. This occurs at the same time that brake 84 stops wiper arm 90.

After the airplane has moved a predetermined distance from the point at which angle A was measured, typically 1,000 yards, the computer activates brake 85 to arrest movement of the second wiper arm 92 of potentiometer 83. This wiper arm is connected in the same manner as the wiper arm 90 in potentiometer 82. Since the first wiper arm 91 of this potentiometer is operative to short out the length of the resistive material represented by angle A, the position of potentiometer 83 represents the sine of B−A. Potentiometer 87 as its wiper arm connected to be positioned by the range readout. The output of this potentiometer, R, is representative of the range from the aircraft to the object sighted and is fed to the potentiometer 83 where it is multiplied by the sine of B−A.

Figure 7:
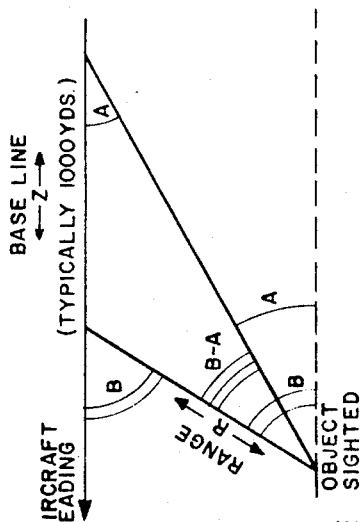
FIG. 7 shows the trigonometry involved in the measurements taken with the inventive sight.

The output of potentiometer 82 corresponding to A, is multiplied by the output of potentiometer 86 corresponding to Z. As seen in FIG. 7, Z is the distance the airplane moves from the point at which angle A is measured to the point at which angle B is measured. The distance Z is represented by the position of the wiper arm of potentiometer 86 and it may be entered either manually or automatically. It should be noted, of course, that potentiometers 82 and 83 are identical and that potentiometers 86 and 87 are identical. The outputs of potentiometer 82, $z \sin A$, and the output of potentiometer 83, $R \sin (B-A)$ are fed to servoamplifier 88. This amplifier compares the tow outputs and yields a signal which represents the difference between them. This signal is then fed to servomotor 89 which positions range readout 93 which in turn positions the wiper arm on potentiometer 87. The difference output of amplifier 88 drives the system to the point where the two values fed to the amplifiers are extremely close and forces the range potentiometer and thus the range readout to the correct value for range. Expressing this mathematically, $Z \cdot \sin A - R \sin (B31 A) = 0$, therefore $R = Z \sin A / \sin (B31 A)$, noting, of course, that by the law of sines $R/Z = \sin A / \sin B-A$ in FIG. 7.

The output of the range potentiometer is then fed to the range display 97 shown on the face of the control panel in FIG. 4. The range display converts this output to a decimal number represented by the distance in yards between the plane and the object sighted at angle B. The output of potentiometer 16 at angle B is fed to the bearing display 96, also shown in FIG. 4, where it is converted to a decimal number representing the angle between the plane and the object sighted.

When this operation is completed the computer is automatically disconnected. Switch 18 is then initiated to reset the computer and prepare it for another operation.

Thus, it is seen that a new and improved electrically augmented sight has been provided. The sight can acquire and stabilize an object in a short period of time and can automatically calculate the range and bearing to the object. It has a wide angle of view, eliminates movement from the image of the object sighted and utilizes electronic enhancement to provide a clear picture of the image.

What I claim is:

1. An optical sight for identifying an object from an aircraft and measuring the range and bearing to the object from the aircraft comprising:
   a cabinet;
   an optical viewer mounted in said cabinet for use in locating an object;
   image stabilization means mounted in said cabinet and operable to produce a stabilized identifiable image of the object located and positioned with respect to said viewer such that the stabilized image may be observed through said viewer;
   means mounted in said cabinet for measuring the bearing to the object as sighted through said viewer from the aircraft; and
   means mounted in said cabinet and connected to said bearing-measuring means for calculating the range to the object from the aircraft after two successive bearing measurements.

2. An optical sight for identifying an object, as in claim 1, wherein said bearing-measuring means comprises a potentiometer 3. An optical sight for identifying an object, as in claim 1, wherein said bearing-measuring means comprises a gyroscope.

4. An optical sight for identifying an object, as in claim 1, wherein said image stabilization means utilizes a closed-circuit television system for presenting an electronically enhanced stabilized image of the object identified.

5. An optical sight for identifying an object, as in claim 4, further comprising
   a dichroic mirror mounted in said optical viewer 6. An optical sight for identifying an object, as in claim 5, wherein said optical viewer has a wide angle of view.

7. An optical sight for identifying an object, as in claim 6, wherein said image stabilization means utilizes first and second gyroscopes for stabilizing the optical image of the object sighted about the x and y axis.

8. An optical sight for identifying an object, as in claim 7, wherein said range-calculating means is a computer.

9. An optical sight for identifying an object, as in claim 8, wherein said computer comprises:
   means connected to said bearing-measuring means for obtaining the sine of angle A, where A is a first bearing from the aircraft to the object sighted;
   means connect to said bearing means for obtaining the sine of angle B−A where B is a second bearing from the aircraft to the object sighted taken after the aircraft has flown a distance Z from the point at which the first bearing was taken;
   means for multiplying the sine of angle A by the distance Z;
   dividing means connected to said multiplying means and said means for obtaining the sine of the angle B−A to divide Z sin A by sin (B−A) to obtain the range of the object identified to the target.

10. An optical sight for identifying an object as in claim 4, wherein said range-calculating means is a computer.

11. An optical sight for identifying an object, as in claim 5, wherein
   said computer comprises means connected to said bearing-measuring means for obtaining the sine of angle A, where A is a first bearing from the aircraft to the object sighted;
   means connected to said bearing-measuring means for obtaining the sine of angle B−A, where B is a second bearing from the aircraft to the object sighted taken after the aircraft has flown a distance Z from the point at which the first bearing was taken;

means for multiplying the sine of angle $A$ by the distance $Z$; dividing means connected to said multiplying means and said means for obtaining the sine of the angle $B-A$ to divide $Z \sin A$ by the $\sin (B-A)$ to obtain the range of the object identified to the target.